US011713116B1

(12) United States Patent
Scalabrino (10) Patent No.: US 11,713,116 B1
(45) Date of Patent: Aug. 1, 2023

(54) REUSABLE CONTAINER WITH LOCKING FEATURES AND TRACKING CAPABILITIES FOR AUTONOMOUS DELIVERY OF GOODS

(71) Applicant: WALGREEN CO., Deerfield, IL (US)

(72) Inventor: Vince Scalabrino, Palatine, IL (US)

(73) Assignee: WALGREEN CO., Deerfield, IL (US)

( * ) Notice: Subject to any disclaimer, the term of this patent is extended or adjusted under 35 U.S.C. 154(b) by 269 days.

(21) Appl. No.: 16/891,158

(22) Filed: Jun. 3, 2020

Related U.S. Application Data

(60) Provisional application No. 62/984,247, filed on Mar. 2, 2020.

(51) Int. Cl.
| *B64C 39/02* | (2023.01) |
| *G05D 1/00* | (2006.01) |
| *G05D 1/10* | (2006.01) |
| *G07C 9/00* | (2020.01) |
| *B65D 5/18* | (2006.01) |
| *G06Q 10/0833* | (2023.01) |
| *G06V 40/12* | (2022.01) |
| *G06V 40/16* | (2022.01) |
| *G10L 17/00* | (2013.01) |
| *B64U 101/60* | (2023.01) |

(52) U.S. Cl.
CPC .................. *B64C 39/02* (2013.01); *B65D 5/18* (2013.01); *G05D 1/0088* (2013.01); *G05D 1/101* (2013.01); *G06Q 10/0833* (2013.01); *G06V 40/12* (2022.01); *G06V 40/16* (2022.01); *G07C 9/00563* (2013.01); *B64U 2101/60* (2023.01); *B64U 2201/10* (2023.01); *G10L 17/00* (2013.01)

(58) Field of Classification Search
CPC .............. B64C 39/02; B64C 2201/128; B64C 2201/141; B65D 5/18; G05D 1/0088; G05D 1/101; G06Q 10/0833; G06V 40/12; G06V 40/16; G07C 9/00563; G10L 17/00
See application file for complete search history.

(56) References Cited

U.S. PATENT DOCUMENTS

| 10,028,606 | B1* | 7/2018 | Ritchie ............. G07C 9/00912 |
| 10,538,190 | B1 | 1/2020 | Metellus et al. |
| 2005/0034420 | A1* | 2/2005 | Radlinger et al. ..... B65D 81/24 |
| | | | 229/182 |
| 2017/0253334 | A1* | 9/2017 | Takayama et al. ....... B64D 1/12 |
| 2018/0144302 | A1* | 5/2018 | Murray et al. .......... G07C 9/37 |
| 2019/0066032 | A1* | 2/2019 | Taveira et al. .......... B65D 85/00 |
| 2019/0161190 | A1* | 5/2019 | Gil et al. ............. B65G 1/0435 |
| 2019/0325719 | A1* | 10/2019 | Bender et al. ......... G08B 13/14 |
| 2020/0151982 | A1* | 5/2020 | Shell et al. ........ G06Q 10/0832 |

FOREIGN PATENT DOCUMENTS

WO 2020/033745 A1 2/2020

OTHER PUBLICATIONS

European Patent Application No. 21160353.5, Extended European Search Report, dated Jun. 25, 2021.

* cited by examiner

*Primary Examiner* — Mohamed Barakat
(74) *Attorney, Agent, or Firm* — Marshall, Gerstein & Borun LLP; Randall G. Rueth (57) ABSTRACT

The present disclosure generally relates to reusable containers having a locking feature and geographic location tracking capabilities. In particular, the present disclosure relates to reusable containers having a locking feature and geographic location tracking capabilities for autonomous delivery of goods.

20 Claims, 9 Drawing Sheets

REUSABLE CONTAINER WITH LOCKING FEATURES AND TRACKING CAPABILITIES FOR AUTONOMOUS DELIVERY OF GOODS

CROSS REFERENCE TO RELATED APPLICATION

The present application claims priority to U.S. Provisional Pat. Application S/N: 62/984,247, entitled A REUSABLE CONTAINER WITH LOCKING FEATURES AND TRACKING CAPABILITIES FOR AUTONOMOUS DELIVERY OF GOODS, filed Mar. 2, 2020, the disclosure of which is incorporated herein in its entirety by reference.

FIELD OF INVENTION

The present disclosure generally relates to reusable containers having a locking feature and geographic location tracking capabilities. In particular, the present disclosure relates reusable containers having a locking feature and geographic location tracking capabilities for autonomous delivery of goods.

BACKGROUND

Delivery of packages via autonomous vehicles (e.g., flying drones, robots, land vehicles, etc.) has become desirable. A secure package having a locking feature is desirable. A package having a package geographic location device is also desirable. A package that reduces costs associated to customer refunds and replacements of delivered goods is needed. Consumers may want to buy products with as little packaging as possible. Some customers may believe that single-use plastic packages should be banned as soon as possible. It is clear that consumers may be coming ever more conscious of waste and carbon footprint that they produce.

A package is provided to meet this demand head on by providing a secure, reusable packaging for shipped goods. A reusable package is provided to meet this demand by providing a secure, reusable packaging for shipped goods

SUMMARY

A package for use with an autonomous delivery system may include a corrugated, recycled plastic. The package may also include a smart lock. The package may further include a geographic location device.

In another embodiment, an autonomous vehicle based delivery system may include an autonomous vehicle and a package deployably attached to the autonomous vehicle. The package may include a package locking mechanism and a package geographic location device. The package may be reusable.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

A package is provided that may be configured as a secure, reusable container designed for remote delivery of goods. A package may be manufactured, at least in part, from corrugated, recycled plastic. A package may feature a smart lock that may be, for example, only opened by a customer or a company employee. The smart lock may include a biometric signature (e.g., fingerprint or facial scan) sensor for unlocking the package. A package may include an integrated short-wave radio tracking device that, for example, may send location data to a fleet network.

The package may, thereby, deter theft and delivery driver/vehicle poachers. The package may reduce costs associated to customer refunds and replacements of delivered goods.

A 2019 survey by Ipsos, a global market research and a consulting firm, found that 75% of consumers want to buy products with as little packaging as possible. Some customers took it even further with 71% believing single-use plastic should be banned as soon as possible. Indeed, consumers are becoming ever more conscious of the waste and carbon footprint that they produce. A package as described herein may be intended to meet these and other demands by providing a secure, reusable packaging for shipped goods.

36% of Americans report at least one stolen package, while 56% of Americans know someone who has suffered such a theft. And in these incidents — only 11% of thieves were ever caught. This issue may have a notable impact on ecommerce sales, with 42% of consumers avoiding the purchase of certain items due to theft. But the biggest financial impact is to consumers themselves. Consumers who have suffered theft have spent an average of nearly $200 in technology preventing future theft.

Figure 1A:
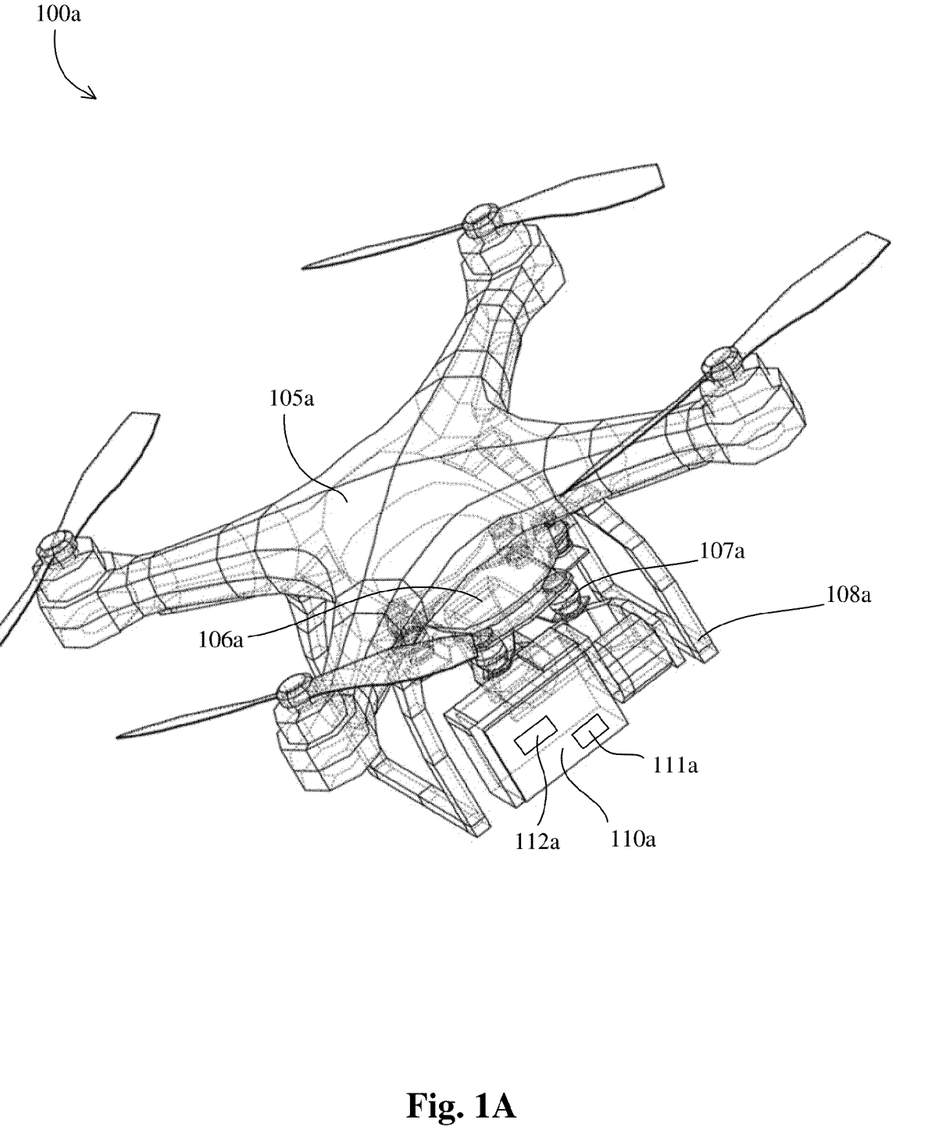
FIG. 1A depicts an example autonomous vehicle carrying a deployable package.

Turning to FIG. 1A, package delivery system 100a may include an autonomous vehicle (e.g., an aerial drone) 105a with a package 110a deployably attached via, for example, an automatic release mechanism 107a. The automatic release mechanism 107a may include an extendable tether configured to, for example, lower the package 110a to a delivery location while the autonomous vehicle 105a maintains a desired hovering elevation. The autonomous vehicle 105a may also include an autonomous vehicle control module 106a and landing gear 108a. The landing gear 108a may be configured to, for example, provide a cushion landing feature.

Figure 1B:
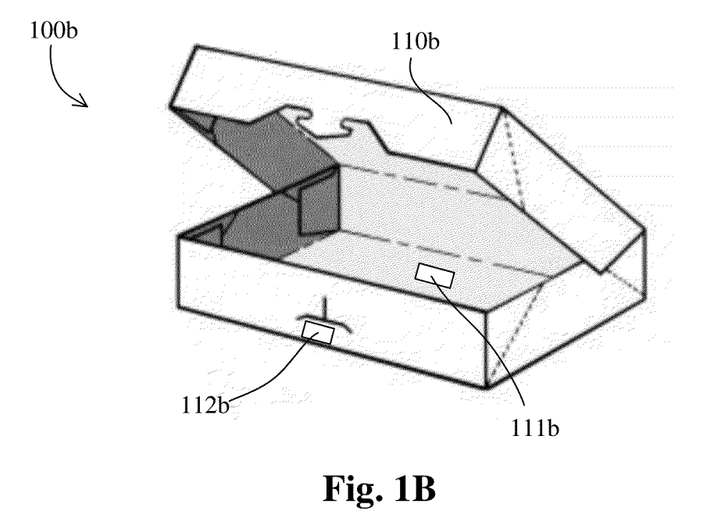
FIGS. 1B and 1C depict an example deployable package for use with an autonomous vehicle delivery system.
Figure 1C:
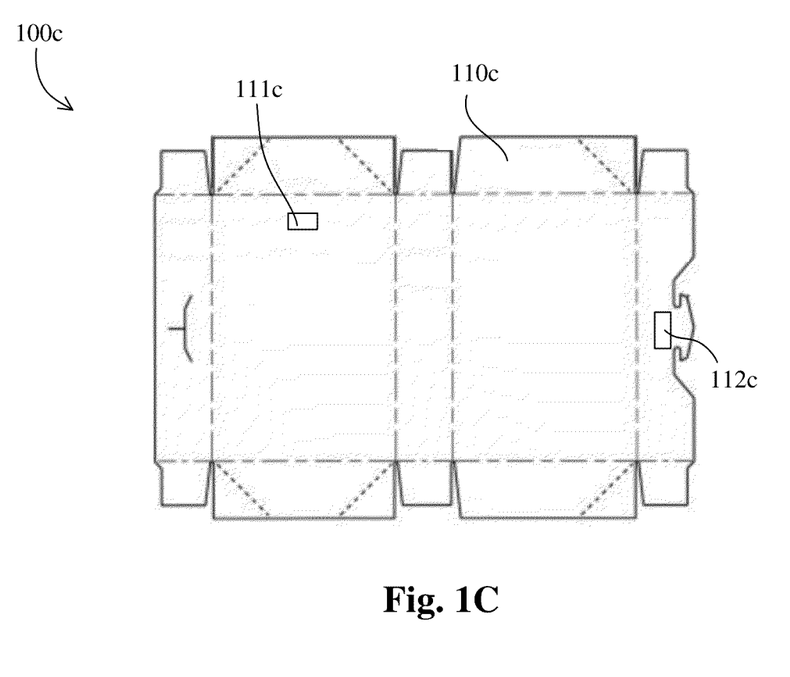

With reference to FIGS. 1B and 1C, a package assembly 100b, 100c may include a reusable structure 110b, 110c having a package control module 111b, 111c and a package locking mechanism 112b, 112c. Further details of the package control module 111b, 111c and the package locking mechanism 112b, 112c are included elsewhere herein.

Figure 2:
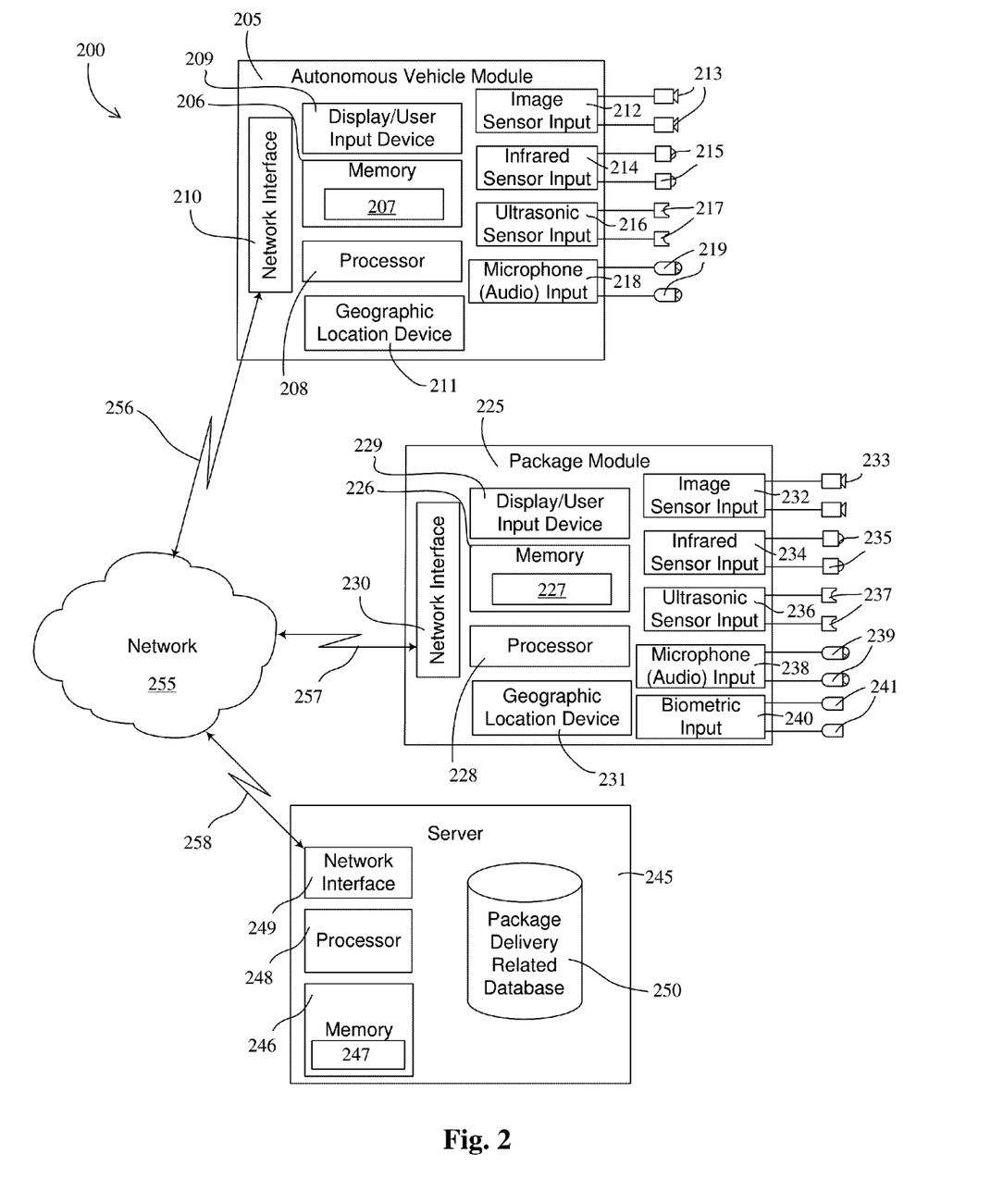
FIG. 2 illustrtes a block diagram of an example computer network for use with an autonomous vehicle package delivery system.

Turning to FIG. 2, a high-level block diagram of an autonomous package delivery system 200 is illustrated that may implement communications between an autonomous vehicle module 205, a package module 225, and a remote computing device 245 (e.g., a remote server) to perform autonomous package delivery. For clarity, only one autonomous vehicle module 205, one package module 225, and one server 245 is depicted in FIG. 2. While FIG. 2 depicts only one autonomous vehicle module 205, one package module 225, and one server 245, it should be understood that any number of autonomous vehicle modules 205, package modules 225, and servers 245 may be supported.

The autonomous vehicle module 205 may include a memory 206 and a processor 208 for storing and executing, respectively, a module 207. The module 207, stored in the memory 206 as a set of computer-readable instructions, may be related to operation of an autonomous vehicle 105a when executed on the processor 208. Execution of the module 207 may also cause the processor 208 to communicate with the processor 228 of the package module 225 and/or the processor 248 of the remote computing device 245 via the network interface 210, the autonomous vehicle module communications network connection 256 and the wireless communication network 255.

The autonomous vehicle module 205 may further include an image sensor input 212 communicatively connected to at least a first image sensor and/or a second image sensor 213. While two image sensors 213 are depicted in FIG. 2, any number of image sensors may be included within an autonomous vehicle 105a. The processor 208 may execute the module 207 to, for example, cause the processor 208 to receive customer facial data from the first image sensor and/or the second image sensor 213.

The autonomous vehicle module 205 may also include an infrared sensor input 214 communicatively connected to at least a first infrared sensor and/or a second infrared sensor 215. While two infrared sensors 215 are depicted in FIG. 2, any number of infrared sensors may be included within an autonomous vehicle 105a. The autonomous vehicle module 205 may further include an ultrasonic sensor input 216 communicatively connected to at least a first ultrasonic sensor and/or a second ultrasonic sensor 217. While two ultrasonic sensors 217 are depicted in FIG. 2, any number of ultrasonic sensors may be included within an autonomous vehicle 105a. The autonomous vehicle module 205 may also include a microphone input 218 communicatively connected to at least a first microphone and/or a second microphone 219. While two microphones 219 are depicted in FIG. 2, any number of microphones may be included within an autonomous vehicle 105a. The autonomous vehicle module 205 may further include a display/user input device 209.

The autonomous vehicle module 205 may also include a geographic location device (e.g., a geographic positioning device) 211. The processor 208 may execute the module 207 to, for example, cause the processor 208 to receive autonomous vehicle geographic location data from the geographic location device 211. The processor 208 may further execute the module 207 to, for example, cause the processor 208 to transmit the autonomous vehicle geographic location data to at least one of the processor 228 and/or the processor 248.

The network interface 210 may be configured to facilitate communications between the autonomous vehicle module 205, the package module 225, and/or the remote computing device 245 via any hardwired or wireless communication network 255, including for example a wireless 5G Network, LAN, MAN or WAN, WiFi, the Internet, a Bluetooth connection, or any combination thereof. Moreover, the vehicle module 205 may be communicatively connected to the package module 225 and/or the remote computing device 245 via any suitable communication system, such as via any publicly available or privately owned communication network, including those that use wireless communication structures, such as wireless communication networks, including for example, a 5G network, wireless LANs and WANs, satellite and cellular telephone communication systems, etc.

The package module 225 may include a memory 226 and a processor 228 for storing and executing, respectively, a module 227. The module 227, stored in the memory 226 as a set of computer-readable instructions, may be related to operation and tracking of a package 110a-c when executed on the processor 228. Execution of the module 227 may also cause the processor 228 to communicate with the processor 208 of the autonomous vehicle module 205 and/or the processor 248 of the remote computing device 245 via the network interface 230, the autonomous vehicle module communications network connection 257 and the wireless communication network 255.

The package module 225 may further include an image sensor input 232 communicatively connected to at least a first image sensor and/or a second image sensor 233. While two image sensors 233 are depicted in FIG. 2, any number of image sensors may be included within package 110a-c. The processor 228 may execute the module 227 to, for example, cause the processor 228 to receive customer facial data from the first image sensor and/or the second image sensor 233.

The package module 225 may also include an infrared sensor input 234 communicatively connected to at least a first infrared sensor and/or a second infrared sensor 235. While two infrared sensors 235 are depicted in FIG. 2, any number of infrared sensors may be included within package 110a-c. The package module 225 may further include an ultrasonic sensor input 236 communicatively connected to at least a first ultrasonic sensor and/or a second ultrasonic sensor 237. While two ultrasonic sensors 237 are depicted in FIG. 2, any number of ultrasonic sensors may be included within package 110a-c. The package module 225 may also include a microphone input 238 communicatively connected to at least a first microphone and/or a second microphone 239. While two microphones 239 are depicted in FIG. 2, any number of microphones may be included within package 110a-c. The package module 225 may further include a display/user input device 229.

The package module 225 may also include a geographic location device (e.g., a geographic positioning device or a communication router triangulation device) 231. The processor 208 may execute the module 227 to, for example, cause the processor 228 to receive package geographic location data from the geographic location device 231. The processor 228 may further execute the module 227 to, for example, cause the processor 228 to transmit the autonomous vehicle geographic location data to at least one of the processor 208 and/or the processor 248.

The network interface 230 may be configured to facilitate communications between the package module 225, the autonomous vehicle module 205, and/or the remote computing device 245 via any hardwired or wireless communication network 255, including for example a wireless 5G Network, LAN, MAN or WAN, WiFi, the Internet, a Bluetooth connection, or any combination thereof. Moreover, the package module 225 may be communicatively connected to the autonomous vehicle module 205 and/or the remote computing device 245 via any suitable communication system, such as via any publicly available or privately owned communication network, including those that use wireless communication structures, such as wireless communication networks, including for example, a 5G network, wireless LANs and WANs, satellite and cellular telephone communication systems, etc.

The remote computing device 245 may include a memory 246 and a processor 248 for storing and executing, respectively, a module 247. The module 247, stored in the memory 246 as a set of computer-readable instructions, may facilitate applications related to autonomous package delivery. The module 246 may also facilitate communications between the computing device 245, the package module 225, and/or the autonomous vehicle module 205 via a network interface 249, a remote computing device network connection 258 and the network 255 and other functions and instructions.

The computing device 245 may be communicatively coupled to an autonomous package delivery system database 250. While the autonomous package delivery system database 250 is shown in FIG. 2 as being communicatively coupled to the remote computing device 245, it should be understood that the autonomous package delivery system database 250 may be located within separate remote servers (or any other suitable computing devices) communicatively coupled to the remote computing device 245. Optionally, portions of the autonomous package delivery system database 250 may be associated with memory modules that are separate from one another, such as a memory 206 of the autonomous vehicle module 205 and/or the memory 226 of the package module 225.

Figure 3A:
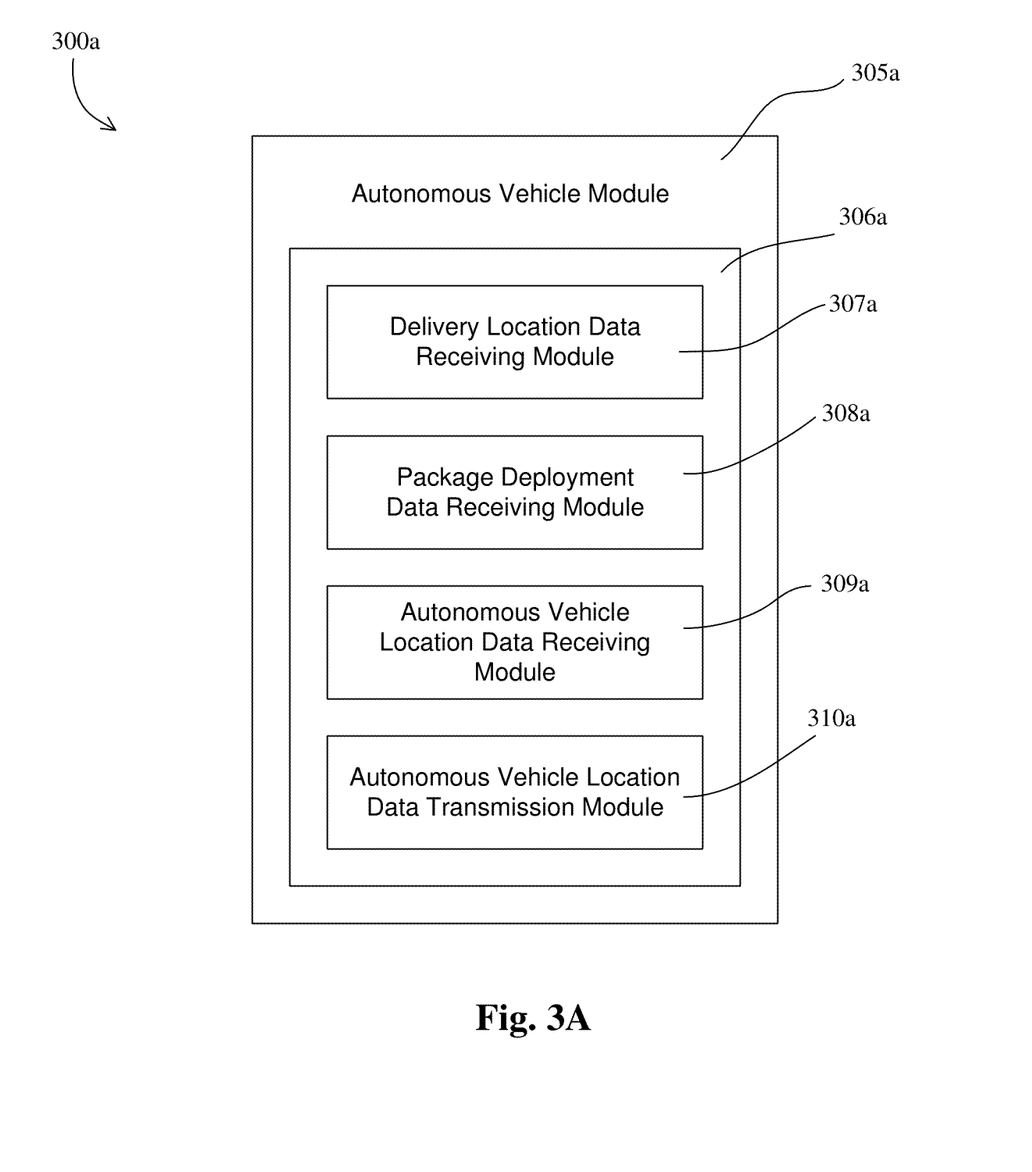
FIGS. 3A and 3B depict an example autonomous vehicle module and an example method of operating an autonomous vehicle.
Figure 3B:
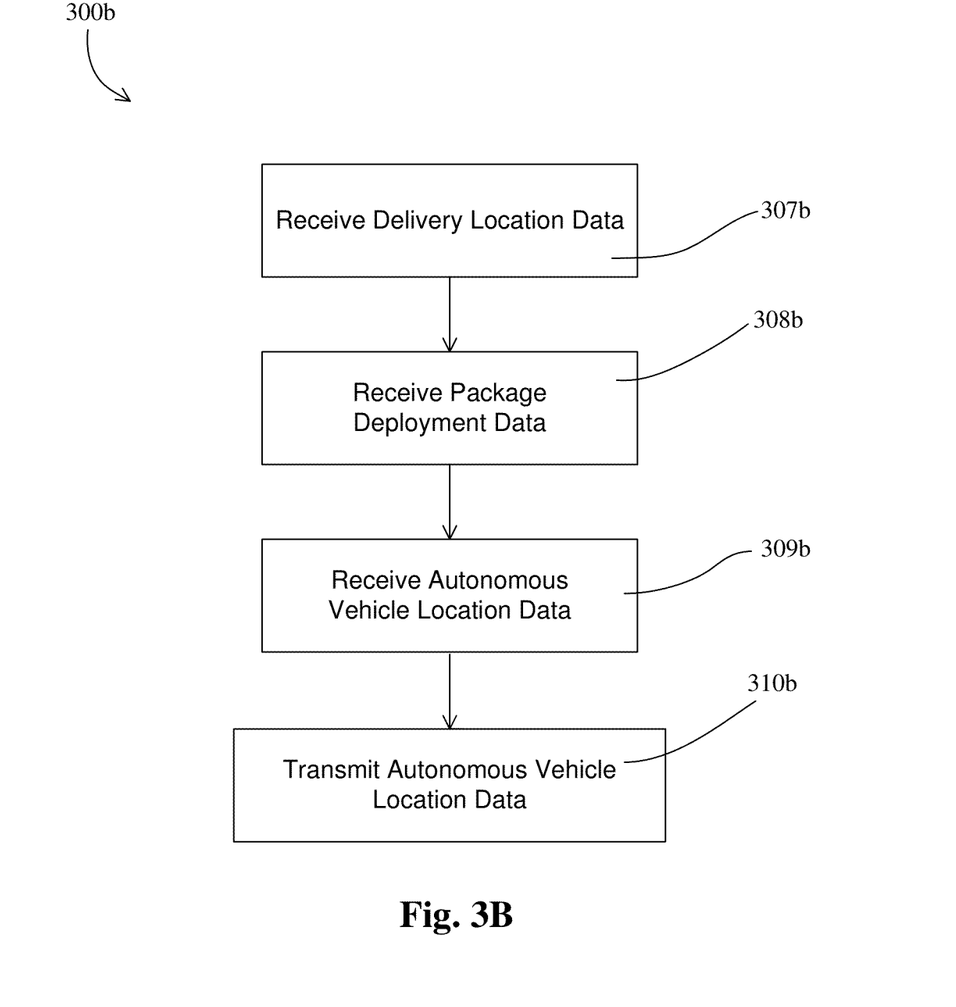

Turning to FIGS. 3A and B, an autonomous vehicle module 305a of an autonomous package delivery system 300a is depicted along with a method of operating the autonomous vehicle module 305a. The autonomous vehicle module 305a may be similar to the autonomous vehicle module 205 of FIG. 2. The method 300b may be implemented by executing the modules 307a-310a on a processor (e.g., processor 208). In any event, the autonomous vehicle module 305a may include a delivery location data receiving module 307a, a package deployment data receiving module 308a, an autonomous vehicle location data receiving module 309a, and an autonomous vehicle location data transmission module 310a stored in a memory 306a as, for example, computer-readable instructions. The processor 208 may execute the delivery location data receiving module 307a to, for example, cause the processor 208 to receive autonomous vehicle location data (block 307b) from a geographic location device 211. The autonomous vehicle location data may be representative of a geographic location and elevation of an autonomous vehicle 105a.

The processor 208 may track an autonomous vehicle 105a based on the autonomous vehicle geographic location data. The processor 208 may compare the autonomous vehicle geographic location data to pre-determined autonomous vehicle route data and the processor 208 may, for example, determine if the autonomous vehicle 105a deviates from a pre-determined route. If the processor 208 determines that the autonomous vehicle 105a has deviated from the pre-determined route, the processor 208 may transmit a notification to a customer and/or an autonomous package delivery system operator.

The processor 208 may execute the package deployment data receiving module 308a to cause the processor 208 to activate the package deployment mechanism 107a (block 308b). For example, the processor 208 may automatically activate the package deployment mechanism 107a based on the delivery location data and autonomous vehicle location data. The processor 208 may execute the autonomous vehicle location data receiving module 309a to determine a position of an associate autonomous vehicle 105a (block 309b). The processor 208 may execute the autonomous vehicle location data transmission module 310a to transmit autonomous vehicle location data to a package module 225 and/or a remote computing device 245 (block 310b).

Figure 4A:
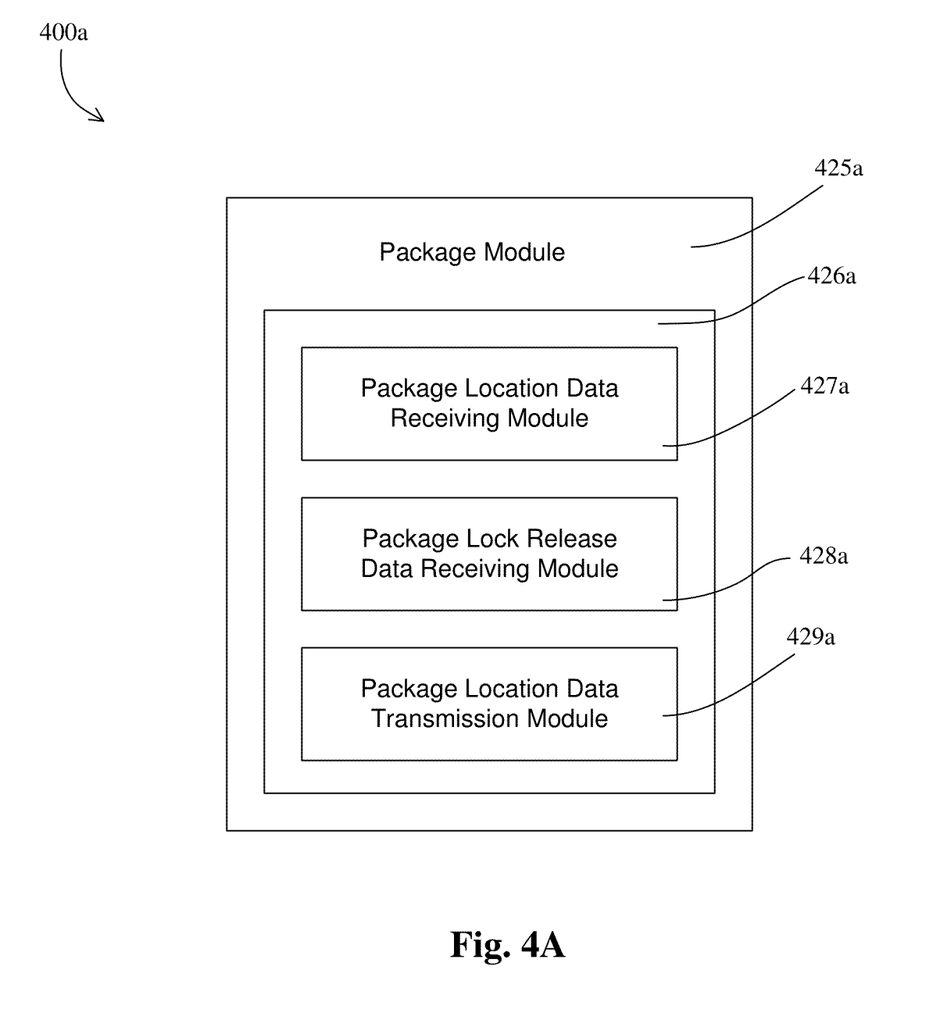
FIGS. 4A and 4B depict an example package module for use with an autonomous vehicle and an example method of package delivery.
Figure 4B:
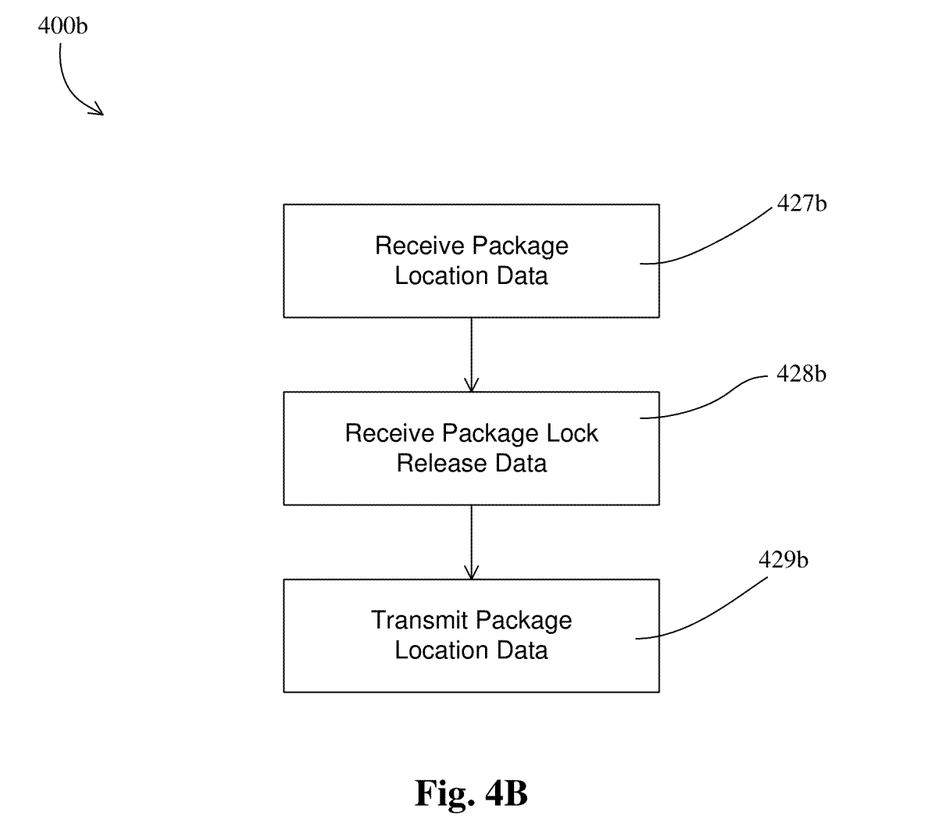

With reference to FIGS. 4A and B, package module 425a of an autonomous package delivery system 400a is depicted along with a method of operating and tracking the package module 425a. The package module 425a may be similar to the package module 225 of FIG. 2. The method 400b may be implemented by executing the modules 427a-429a on a processor (e.g., processor 228). In any event, the package module 425a may include a package location data receiving module 427a, a package lock release data receiving module 428a, and a package location data transmission module 429a stored in a memory 4266a as, for example, computer-readable instructions. The processor 228 may execute the package location data receiving module 427a to, for example, cause the processor 228 to receive package location data (block 427b) from a geographic location device 231. The package location data may be representative of a geographic location and elevation of a package 110a-c.

The processor 228 may execute the package lock release data receiving module 428a to cause the processor 228 to activate the package lock mechanism 112a-c (block 428b). For example, the processor 228 may automatically activate the package lock mechanism 112a-c based on facial recognition data received from an image sensor 233, voice data received from a microphone 239, and/or biometric data received from a biometric sensor 241. The processor 228 may execute the package location data transmission module 429a to transmit package location data to an autonomous vehicle module 205 and/or a remote computing device 245 (block 429b).

The processor 228 may track package 110a-c based on the package geographic location data. The processor 228 may compare the package geographic location data to pre-determined package route data and the processor 228 may, for example, determine if the package 110a-c deviates from a pre-determined route. If the processor 228 determines that the package 110a-c has deviated from the pre-determined route, the processor 228 may transmit a notification to a customer and/or an autonomous package delivery system operator.

Figure 5A:
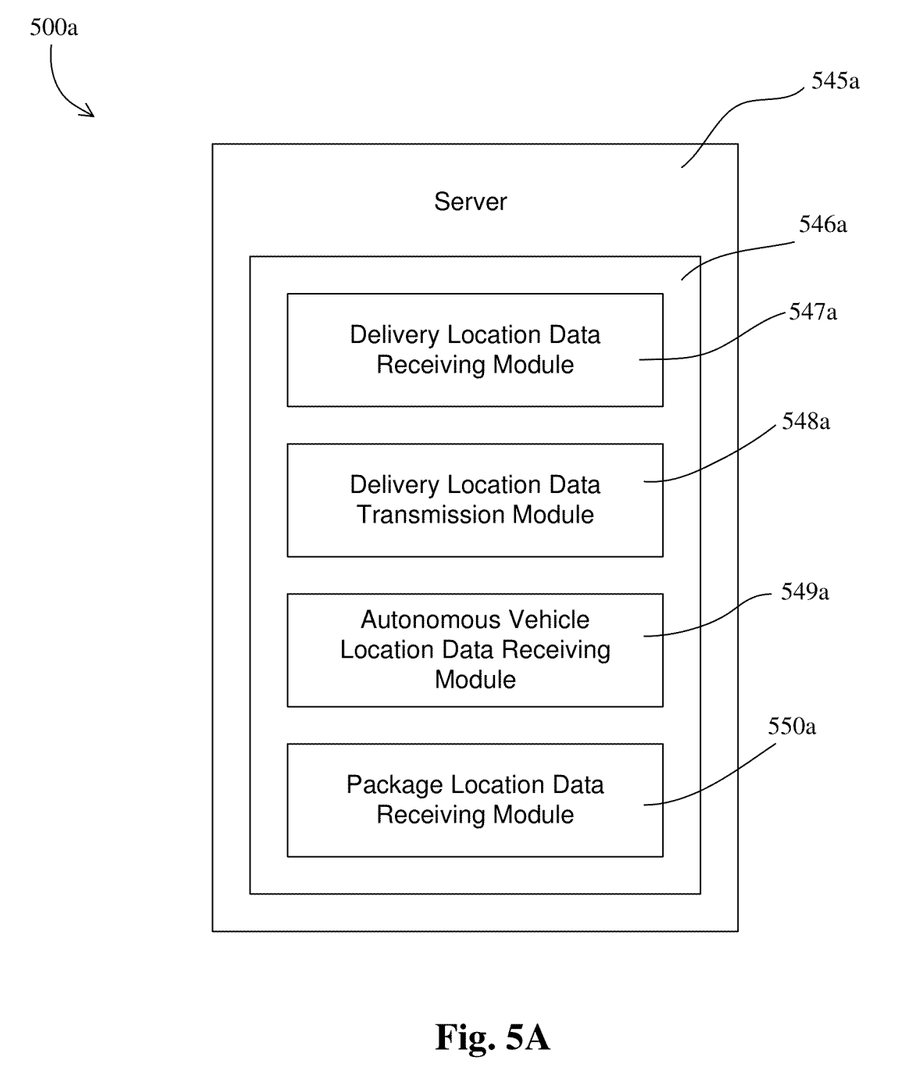
FIGS. 5A and 5B depict an example server and an example method of operating a server within an autonomous vehicle package delivery system.
Figure 5B:
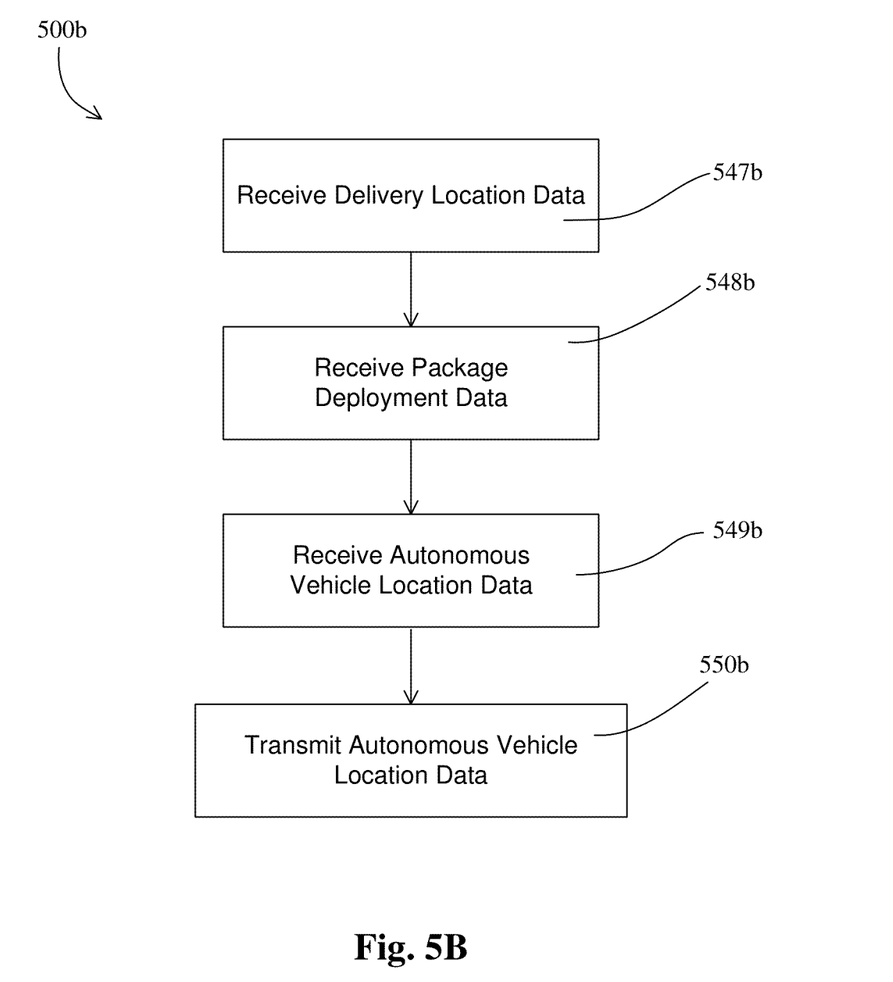

Turning to FIGS. 5A and B, a server 545a of an autonomous package delivery system 500a is depicted along with a method of operating the server 545a. The server 545a may be similar to the server 245 of FIG. 2. The method 500b may be implemented by executing the modules 547a-550a on a processor (e.g., processor 248). In any event, the server 545a may include a delivery location data receiving module 547a, a package deployment data transmission module 548a, an autonomous vehicle location data receiving module 549a, and package location data receiving module 550a stored in a memory 546a as, for example, computer-readable instructions. The processor 248 may execute the delivery location data receiving module 547a to, for example, cause the processor 248 to receive package delivery location data (block 547b) from, for example, a system operator or a customer. The package deliver location data may be representative of a geographic location and elevation where a package 110a-c is to be picked up and a geographic location and elevation where the package 110a-c is to be delivered.

The processor 248 may execute the package deployment data transmission module 548a to cause the processor 248 to transmit package deployment data to a package deployment mechanism 107a (block 548b). For example, the processor 248 may automatically activate the package deployment mechanism 107a based on the delivery location data and autonomous vehicle location data. The processor 248 may execute the autonomous vehicle location data receiving module 549a to determine a position of an associate autonomous vehicle 105a (block 549b). The processor 248 may execute the package location data receiving module 550a to receive package location data from a package module 225 and/or an autonomous vehicle module 205 (block 550b).

The systems of the present disclosure may incorporate E-commerce that may revolutionize the way consumers shop. Everything from prescriptions, medical devices, hair care products to gourmet meals for a pet can be purchased online and delivered directly to a front door within hours. However, the convenience of online shopping can also come with unexpected drawbacks such as coming home to find out that a package has been stolen. Package theft is a growing problem across America as 36% have reported having a package stolen at least once.

Nearly one-half (44%) of customers may receive some type of package on a weekly basis. On average, customers may get 45 packages delivered to their home per year. For some individuals that number is slightly higher at 51. Some customers may receive about 25 packages annually. Some customers may spend an average of $222 per month on online orders.

With one single package potentially containing hundreds of dollars worth of goods, package thieves, or "porch pirates," may see a package as a ripe opportunity to steal. More than one-third (36%) of customers may have been a victim of package theft. Of those, 44% have had a package stolen at least twice. Most package theft victims (83%) said they contacted the seller or Amazon immediately after finding out their package had been stolen, while only 13% called the police right away. Overall, very few (11%) said the porch pirate was caught, but thankfully, 73% of package theft victims said they eventually received a refund. Packages and delivery systems of the present disclosure may minimize theft and loss.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. An autonomous vehicle based delivery system, the system comprising:
    an autonomous vehicle having an autonomous vehicle geographic location device that generates autonomous vehicle location data representative of a geographic location and elevation of the autonomous vehicle; and
    a reusable container deployably attached to the autonomous vehicle via an extendable tether configured to lower the reusable container to a delivery location while the autonomous vehicle maintains a desired hovering elevation, wherein the reusable container includes a package locking mechanism and a package geographic location device that generates package location data representative of a geographic location and elevation of the reusable container, wherein an automatic package release mechanism is activated to release goods from the reusable container when a geographic location and elevation of the autonomous vehicle and the reusable container are representative of a predetermined geographic location and elevation.

2. A system as in claim 1, wherein the autonomous vehicle is an aerial vehicle.

3. A system as in claim 1, wherein the reusable container includes a corrugated plastic material.

4. An autonomous goods delivery system, the system comprising:
    a reusable container deployably attached to an autonomous vehicle via an extendable tether configured to lower the reusable container to a delivery location while the autonomous vehicle maintains a desired hovering elevation;
    a smart lock that can only be opened by an authorized individual to remove goods from the reusable container; and
    a geographic location device that generates package location data representative of a geographic location and elevation of the reusable container, wherein the smart lock is activated to remove the goods from the reusable container when the geographic location and elevation of the reusable container are representative of a predetermined geographic location and elevation.

5. A system as in claim 4, wherein the reusable container includes a corrugated, recycled plastic.

6. A system as in claim 4, wherein the smart lock can only be opened by the customer or a company employee using a biometric signature selected from the group: a fingerprint or a facial scan.

7. A system as in claim 4, wherein the geographic location device includes an integrated shortwave radio tracking device that sends location data to a fleet network.

8. A system as in claim 4, wherein the smart lock is configured to deter theft of the goods and delivery driver/vehicle poachers.

9. An autonomous vehicle based delivery system, the system comprising:
    an autonomous vehicle having an autonomous vehicle geographic location device that generates autonomous vehicle location data representative of a geographic location and elevation of the autonomous vehicle;
    a reusable container deployably attached to the autonomous vehicle via an extendable tether configured to lower the reusable container to a delivery site, wherein the reusable container includes a package geographic location device that generates package location data representative of a geographic location and elevation of the reusable container; and
    a location notification that is activated when goods are removed from the reusable container and at least one of: a geographic location and elevation of the autonomous vehicle, or a geographic location and elevation of the reusable container deviate from a predetermined geographic location and elevation.

10. A system as in claim 9, wherein the autonomous vehicle is an aerial vehicle.

11. A system as in claim 9, wherein the reusable container includes a corrugated plastic material.

12. A system as in claim 9, wherein the reusable container further comprising:
    a smart lock that can only be opened by an authorized individual, wherein the smart lock is activated when a geographic location and elevation of the reusable container are representative of a predetermined geographic location and elevation of the reusable container.

13. A system as in claim 12, wherein the reusable container is designed for remote delivery of the goods.

14. A system as in claim 12, wherein the smart lock can only be opened by the customer or a company employee using a biometric signature selected from the group: a fingerprint or a facial scan.

15. A system as in claim 12, wherein the reusable container geographic location device includes an integrated shortwave radio tracking device that sends location data to a fleet network.

16. A system as in claim 12, wherein the smart lock is configured to deter theft of the goods and delivery driver/vehicle poachers.

17. A system as in claim 9, wherein the location notification is transmitted to a remote device.

18. A system as in claim 9, wherein the location notification is transmitted to a customer device.

19. A system as in claim 9, wherein a package deployment mechanism is automatically activated when an elevation of the autonomous vehicle and the reusable container are less than a predetermined elevation.

20. A system as in claim 9, wherein a package deployment mechanism is automatically activated when an elevation of the autonomous vehicle is less than a predetermined elevation.

* * * * *